April 4, 1961

L. BUCALO 2,977,793

PNEUMATIC PROBE ASSEMBLY FOR DETECTING AIRSTREAM DIRECTION

Filed Feb. 25, 1957

INVENTOR.
LOUIS BUCALO
BY
John C. McGrega
ATTORNEY

April 4, 1961 L. BUCALO 2,977,793
PNEUMATIC PROBE ASSEMBLY FOR DETECTING AIRSTREAM DIRECTION
Filed Feb. 25, 1957 2 Sheets-Sheet 2

INVENTOR.
LOUIS BUCALO
BY
John C. McGregor
ATTORNEY ent Office 2,977,793
Patented Apr. 4, 1961

2,977,793

PNEUMATIC PROBE ASSEMBLY FOR DETECTING AIRSTREAM DIRECTION

Louis Bucalo, Holbrook, N.Y., assignor to Specialties, Inc., Syosset, N.Y., a corporation of New York Filed Feb. 25, 1957, Ser. No. 642,093

8 Claims. (Cl. 73—180)

This invention relates to probe assemblies, and more particularly to pneumatic probe assemblies adapted to extend into the airstream attendant the flight of aircraft or the like to determine a directional characteristic.

Instruments have been devised to detect airstream direction, that is, the direction of the flight path of an aircraft relative to a fore and aft reference line and known as angle of attack. The detecting element of these instruments is a probe which extends into the airstream and which is rotated by the energy of the airstream to assume a predetermined angle relative thereto. This is accomplished, broadly speaking, by admitting air into the probe from two circumferentially-spaced locations on the probe surface and directing the resulting static pressures into the body of the instrument for differential comparison. Because channels or ducts in the probe place the internal works of the instrument in communication with the atmosphere, water tends to find its way into conventional instruments. Damage can result, particularly with salt water.

In accordance with the present invention, therefore, there is provided a probe assembly including a plurality of ducts capable of passing pneumatic signals from the atmosphere to the inside of an instrument and which is capable of either rejecting or by-passing water both when the aircraft is grounded and in flight. In accordance with the present invention, the probe assembly can take the form of a cylindrical shank formed with a first pair of pneumatic transmission channels extending substantially the entire length thereof and overlapping the admission channels. Corresponding admission and transmission channels are connected by passing through openings which are so located that water flowing in the admission channels will not pass. The shank is covered by a sheath closing the channels and perforated along two lines overlying, respectively, the two admission channels. The assembly is mounted on an airplane with the sheathed shank projecting laterally into the airstream. The inner end of the assembly is rotatably mounted in the body of the instrument which is normally carried inboard. Preferably the perforation pattern is such that substantial water flow in and out of the probe is permitted only adjacent the ends of the admission channels spaced from the pass-through openings. Thus, rain water or spray will not enter the transmission channels of the probe when the airplane is landborne or airborne.

Between the admission channels, along what normally is the stagnation line of the probe which is most susceptible to icing, the shank is formed beneath the sheath with a heater channel terminating at the end of the probe assembly in a sealed thermostat unit.

A representative embodiment of the invention from which the above and other features will be readily apparent is described below, having reference to the accompanying drawings, in which:

Figure 3 is a second full-length view, partly in longitudinal section, of the probe assembly rotated 90° on its axis with respect to the view of Figure 1;

Figure 4 is a third full-length view partly in section of the probe assembly rotated on its axis 180° with respect to the view of Figure 3.

Figure 1:
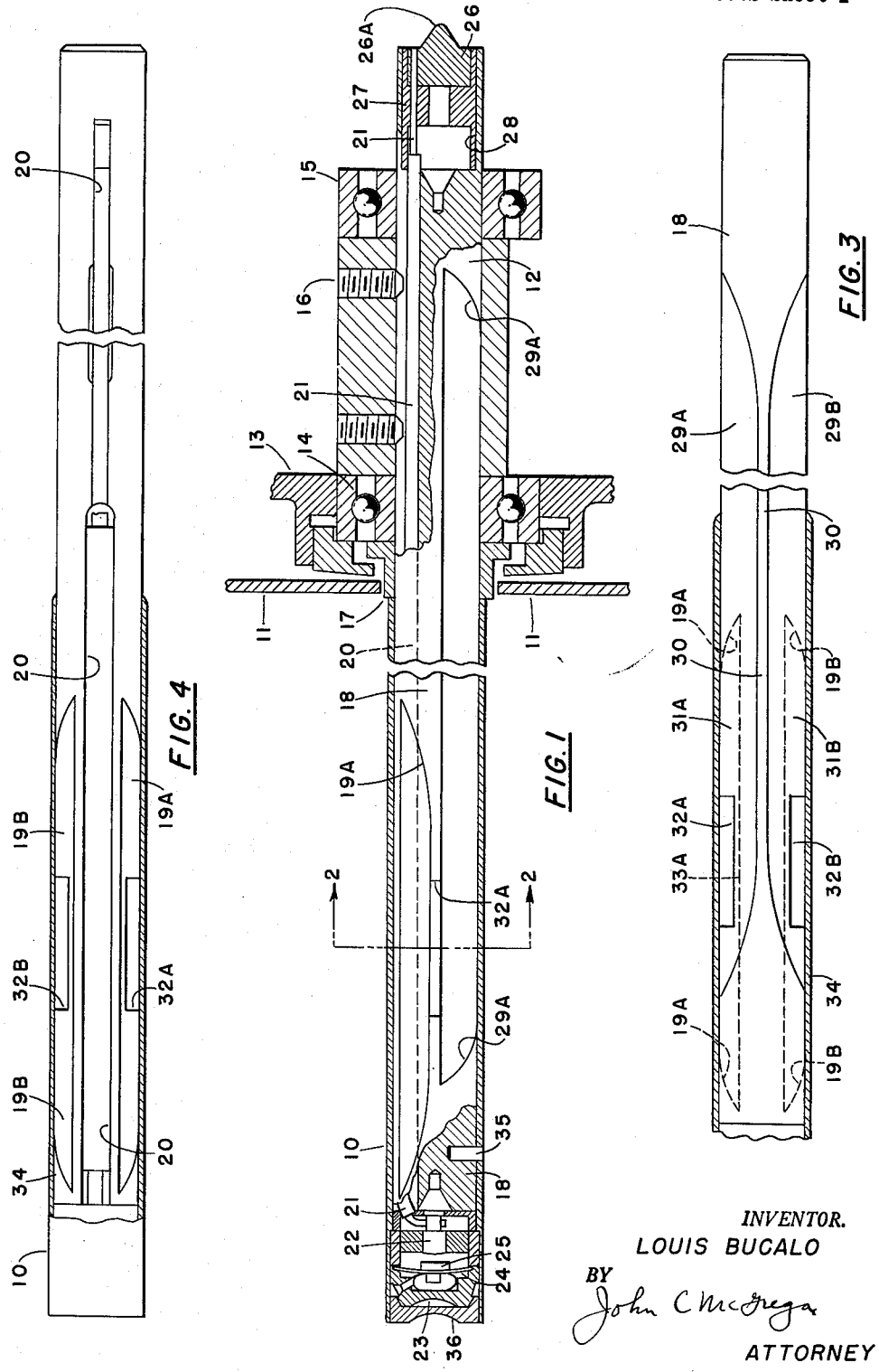
Figure 1 is a full-length view, partly in section and partly in elevation, of a probe assembly and showing also a portion of an instrument in which the probe assembly mounts.

The probe assembly, which illustrates the present invention, is indicated generally by the numeral 10 and is illustrated in Figure 1 in its operating position projecting laterally out of the fuselage 11 of an airplane into the wind stream. The inner end 12 of the probe assembly is received in the body of an instrument, indicated generally by the numeral 13, forming no part of the present invention and only partially illustrated herein. An instrument of this type is illustrated and described in the co-pending application Serial No. 651,056, filed April 5, 1957. Within the body of the instrument 13 the probe assembly 10 is journalled in bearings 14 and 15 for rotation about its longitudinal axis, being coupled by clamping means 16 to drive moving parts of the instrument.

Figure 2:
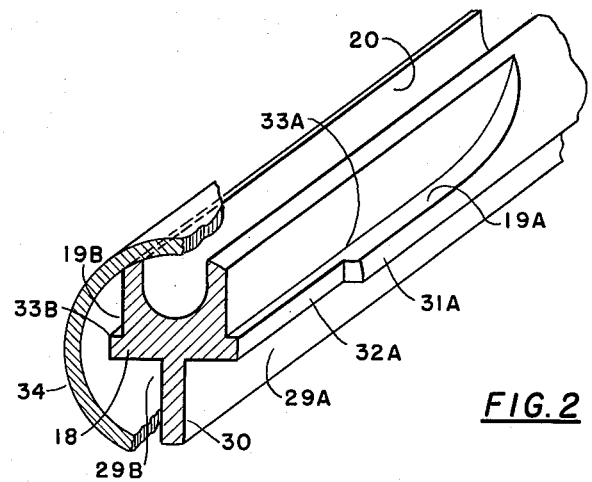
Figure 2 is a view in perspective of a portion of the assembly as viewed, beginning at its near end, in transverse section taken generally on the line 2—2 of Figure 1 looking in the direction of the arrows.

The probe assembly passes out of the body of the instrument and into the airstream through a water-sealing collar assembly indicated generally by the numeral 17. Internally, the assembly includes a central shank or mandrel portion 18, preferably formed from a single piece of cylindrical stock extending substantially the full length of the probe. Near its outer end the shank 18 is formed with a pair of pneumatic admission channels 19a and 19b. The channels 19a and 19b are formed in the shank as by milling, for example, along parallel laterally-spaced lines flanking the shank axis as viewed in Figure 4. In the space between channels 19a and 19b the shank is formed with a relatively narrow heater-accommodating channel 20 which is preferably as long as the portion of the probe assembly which is in the airstream. An electric resistance heater 21 (shown only in Figure 1) is fitted in the channel 20. The outer end of the resistance heater 21 terminates in a contact 22 which is part of a thermostat assembly 23 including a thermostatic element 24 such as a bi-metallic snap disk, carrying a contact 25 adapted to engage the contact 22 to ground the heater, which throughout its length is electrically insulated from the body of the probe assembly. The inner end of the heater 21 is joined as by soldering to an electrical contact 26 mounted in an insulated bushing 27 received in a cylindrical opening 28 formed in the inner end of the shank 18. The contact 26 includes a tip portion 26a on the axis of the probe assembly, thereby to impose minimum resistance to the rotary motion thereof when in frictional contact with its companion stationary contact (not shown). The shank 18 on its opposite side from the admission channels 19a and 19b is formed with a pair of elongated pneumatic transmission channels 29a and 29b which can be formed, for example, by milling along parallel lines disposed on either side of the axis of the shank as viewed in Figure 3, the channels thereby being separated by a barrier wall 30 terminating in the cylindrical surface of the shank. The outer ends of the transmission channels 29a and 29b overlap a substantial portion of the length, preferably at least half of the admission channels 19a and 19b respectively. The relative depths of the channels 19a and 19b and of the adjacent channels 29a and 29b are such that barrier walls 31a and 31b are disposed respectively therebetween. The barrier walls 31a and 31b have openings 32a and 32b respectively formed therein at locations which are generally centralized with respect to the lengths of the channels 19a and 19b. These openings are also substantially shorter than the channels 19a and 19b, and their depth is carefully measured, as best seen in Figure 2, to provide water-flow paths or channels 33a and 33b made up of the intersecting surfaces which define each channel and the function of which is described below.

Fitted over the shank 18 is a tubular sheath or casing 34 which tightly engages in air and water sealing relationship the outer surfaces, radially speaking, of the cylindrical shank 18. In this fashion, the opened channels 19a, 19b, 29a, and 29b are converted to conduits or passages oriented lengthwise of the probe assembly and are independent of one another with the singular exception of the opening 32a, which joins the channel 19a to the channel 29a at a predetermined location, and the opening 32b, which similarly connects the channels 19b and 29b. The sheath 34 is permanently secured in place as by shrink fit and by pins 35 pressed into the sheath and the shank. The sheath 34 extends outwardly beyond the end of the shank 18 to receive the thermostat assembly 23, which is sealed in place by a plug 36.

Figure 5:
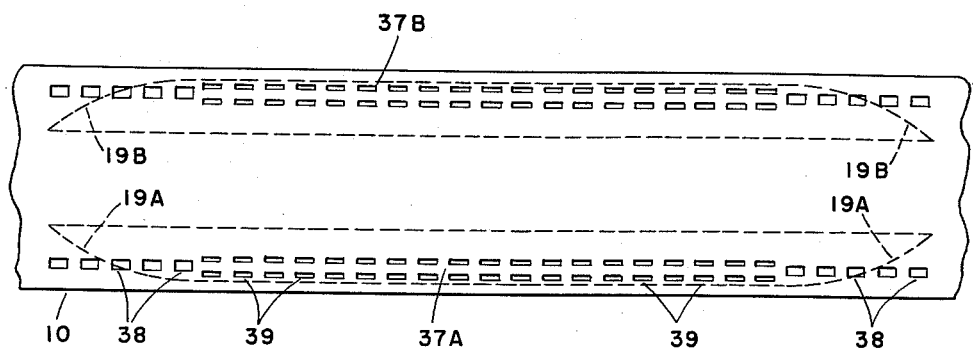
Figure 5 is an enlarged fragmentary view of the probe assembly as seen from the direction of Figure 4 but showing the external sheath or casing and the perforation pattern therein.

The sheath 34 is pierced, as best seen in Figure 5, in a perforation pattern placing the outer atmosphere in communication with the pneumatic admission channels 19a and 19b, a series of perforations 37a being provided for the channel 19a and a series 37b for the channel 19b. Each line of perforations 37a and 37b extends substantially the entire length of its corresponding channel. The two perforation patterns 37a and 37b are substantially identical, and only the pattern 37a will be described in detail. At either end the pattern is formed with a series of openings or slots 38 which are of such size that they are capable of passing water in its liquid phase and are indifferent therefore to the surface tension effects of the water. Between the relatively larger openings or slots 38 the perforation pattern 37a includes an array of holes or slots 39 preferably in the form of two parallel lines of holes or slots so dimensioned and proportioned that they reject the passage of water in its liquid phase which might be accumulated on the surface of the probe assembly. It will be observed that the array of holes 39 extend over the entire length of the opening 32a which joins the channels 19a and 29a in the shank position.

In a working probe assembly the holes 38 were made in slot form with a length of .031 to .033 inch and a width of approximately .014 inch. Seven aligned slots were provided at each end of the perforation pattern. The holes 39, seventy-two of which were provided in all, each with a length of .031 to .033 inch and a width of approximately .008 inch. The perforation patterns 37a and 37b are separated from each other by an angle of approximately 90° measured circumferentially on the surface of the probe assembly, each being approximately 45° away from the center line of the heater channel 20 as viewed in Figure 4.

In operation, as the probe assembly is subjected to the forces of an airplane in flight, air is admitted into the two perforation patterns 37a and 37b which results in pneumatic pressure in the body of the instrument 13 which, through mechanism forming no part of the present invention, rotates the probe assembly on its axis to present the perforation patterns in a position facing the direction of the airstream at equal angles at either side thereof, the stagnation point (the point of theoretical zero air motion) occurring on the surface of the sheath 34 along the center line of the channel 20 as viewed in Figure 4. Any change in the direction of the airstream relative to the airplane will, in accordance with principles understood in the art of aircraft instrumentation, cause the probe assembly to rotate to a new position representing the new angle of the airstream relative to the airplane. With the probe assembly extending horizontally outward from the side of the fuselage of an airplane, the readings derived represent angle of attack.

Water entering the admission channels 19a and 19b through the perforation patterns when the airplane is land or carrier-borne will be substantially blocked from entering the body of the instrument through the transmission channels 29a and 29b. The entering water will flow to one end or the other of the admission channels 19a and 19b where it can leak out through the openings 38. In passing from one end of the channels 19a or 19b to the other, the water flows in the water-flow path 33a and is thereby prevented from entering either of the transmission channels. Thus, the probe assembly is capable of rejecting water which might occur as a result of rain, spray, or washing. Because water is prevented from entering the relatively smaller holes 39, there is no direct path into the transmission channels.

Icing of the probe assembly while airborne is effectively eliminated by the resistance heater element which passes along the stagnation line (the point at which maximum icing normally occurs) closely adjacent the perforation patterns.

While the invention has been described above having reference to a specific embodiment thereof, it will be understood that it can take various forms and arrangements. Thus, for example, while the channels in the shank have been shown in a form resulting from milling operations, they can take other shapes which might result, for example, were the shank to be cast. In any case, however, it is essential that the functional shoulders and barriers described herein be present. The invention should not, therefore, be regarded as limited except as defined in the following claims:

I claim:

1. In a pneumatic probe, transmission channel means to pass pneumatic signals along the length of the probe, means forming inlet openings in a lateral surface of the probe and extending axially thereof, admission channel means in the probe beneath said openings and extending axially of the probe for substantially the length of the openings, and means defining an opening placing the admission channel means intermediate its ends in commuication with the transmission channel means, said admission channel means including a water flow channel connected between its ends and by passing said opening to the transmission channel, said openings on the lateral surface of the probe including an array of slots, the slots adjacent the ends of the array being relatively large and those intermediate the ends being sufficiently small to reject static water under the influence of surface tension, said opening to the transmission channel being out of alignment with the end slots.

2. In a pneumatic probe, a pair of transmission channel means extending lengthwise of the probe to pass pneumatic signals, means forming two substantially parallel lines of inlet openings in a lateral surface of the probe extending axially thereof, a pair of admission channels in the probe disposed respectively beneath the two lines of inlet openings for substantially the full lengths thereof, and means defining openings placing the respective admission channels in communication with the transmission channels, the last said openings being disposed intermediate the ends of the admission channels and being of substantially smaller size, and water by-pass channels connecting opposite ends of each admission channel to carry water past said openings without entering the transmission channels.

3. A probe as set forth in claim 2, said two lines of inlet openings each comprising an array of slots, the slots of each array intermediate the ends being of a size sufficiently small to reject static water under the effects of surface tension, the slots adjacent the ends of the arrays and remote from the openings leading to the transmission channels being relatively larger.

4. A pneumatic probe comprising a generally cylindrical shank portion, a pair of elongated pneumatic transmission channels disposed respectively in a pair of adjacent quadrants of the shank and extending axially thereof, a pair of relatively shorter pneumatic admission channels disposed respectively in the other two quadrants of the shank adjacent one end thereof and overlapping the transmission channels axially of the shank, said admission channels each being separated from a corresponding transmission channel by a wall, each wall having an opening therein adjacent the center of an admission channel and communicating with the corresponding transmission channel, said openings being spaced from the inner edges of their respective barriers to define, together with another wall of the channels, a water runway, and a tubular sheath closely surrounding the shank and closing the several channels, said sheath being formed with openings communicating with the admission channels.

5. A probe as set forth in claim 4, said admission channels being separated by a barrier, and a heater element in the third wall barrier.

6. A probe as set forth in claim 5, including a chamber adjacent the end of the probe, and thermostat means in the chamber to control the heater element.

7. A probe as set forth in claim 4, said openings including arrays of slots extending substantially over the lengths of the admission channels axially of the probe, the slots adjacent the ends of the admission channels being relatively large and those intermediate the ends being relatively smaller to reject the passage of water under the effect of surface tension, said transmission and admission channels each being defined by pairs of mutually perpendicular walls in the shank portion and by the adjacent portions of said sheath.

8. A probe as set forth in claim 7, including a barrier between the admission channels, a groove in the barrier, an electrical resistance heater element in the groove, thermostat means to ground the heater element at the outer end of the shank, a contact for the opposite end of the heater element at the inner end of the shank disposed on the axis thereof, and bearing means to mount the probe for rotation about its axis.

References Cited in the file of this patent

UNITED STATES PATENTS

| | | |
|---|---|---|
| 1,971,534 | Peace | Aug. 28, 1934 |
| 2,370,102 | Woodman | Feb. 20, 1945 |
| 2,513,390 | Young | July 4, 1950 |
| 2,650,497 | Renwanz | Sept. 1, 1953 |
| 2,660,056 | Schuck et al. | Nov. 24, 1953 |
| 2,725,746 | Young | Dec. 6, 1955 |
| 2,834,208 | Westman | May 13, 1958 |
| 2,876,640 | Beach | Mar. 10, 1959 |

FOREIGN PATENTS

| | | |
|---|---|---|
| 700,877 | Great Britain | Dec. 9, 1953 |
| 1,127,110 | France | Aug. 6, 1956 |